United States Patent
Issa et al.

(10) Patent No.: US 7,162,652 B2
(45) Date of Patent: Jan. 9, 2007

(54) INTEGRATED CIRCUIT DYNAMIC PARAMETER MANAGEMENT IN RESPONSE TO DYNAMIC ENERGY EVALUATION

(75) Inventors: Sami Issa, Phoenix, AZ (US); Uming Ko, Plano, TX (US); Baher Haroun, Allen, TX (US); David Scott, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 451 days.

(21) Appl. No.: 10/739,469

(22) Filed: Dec. 18, 2003

(65) Prior Publication Data

US 2004/0260958 A1    Dec. 23, 2004

Related U.S. Application Data

(60) Provisional application No. 60/480,053, filed on Jun. 20, 2003.

(51) Int. Cl.
  *G06F 1/00*   (2006.01)
  *G06F 1/32*   (2006.01)
  *G01R 31/02*  (2006.01)
(52) U.S. Cl. .................. 713/300; 713/320; 324/763
(58) Field of Classification Search ............. 713/300, 713/320; 324/763; 326/95
  See application file for complete search history.

(56) References Cited

U.S. PATENT DOCUMENTS 6,141,762 A * 10/2000 Nicol et al. ............... 713/300
6,844,750 B1 *  1/2005 Hsu et al. .................. 324/763
7,002,375 B1 *  2/2006 Hsu et al. .................... 326/95

FOREIGN PATENT DOCUMENTS

JP          11053882 A *  2/1999

* cited by examiner

*Primary Examiner*—Thomas Lee
*Assistant Examiner*—Suresh K Suryawanshi
(74) *Attorney, Agent, or Firm*—Steven A. Shaw; W. James Brady; Frederick J. Telecky, Jr.

(57) ABSTRACT

A power management system (12) in an electronic device (10). The system comprises circuitry ($14_x$), responsive to at least one system parameter, for providing data processing functionality, where the circuitry for providing data processing functionality comprises a data path ($CP_x$). The system alternatively or cumulatively also comprises circuitry ($22_x$) for indicating a potential capability of operational speed of the data path and/or circuitry ($24_x$) for indicating an amount of current leakage of the circuitry for providing data processing functionality. The system also comprises circuitry (26) for adjusting the at least one system parameter in response to either or both of the circuitry for indicating a potential capability and the circuitry for indicating an amount of current leakage.

36 Claims, 3 Drawing Sheets

INTEGRATED CIRCUIT DYNAMIC PARAMETER MANAGEMENT IN RESPONSE TO DYNAMIC ENERGY EVALUATION

CROSS-REFERENCES TO RELATED APPLICATIONS

This application claims priority, under 35 U.S.C. §119(e)(1), of U.S. Provisional Application No. 60/480,053, filed Jun. 20, 2003, and incorporated herein by this reference.

This application relates to U.S. patent application Ser. No. 10/739,747 (TI36578), entitled "Integrated Circuit Speed Capability Indicator", and filed on the same date as the present application.

STATEMENT REGARDING FEDERALLY SPONSORED RESEARCH OR DEVELOPMENT

Not Applicable.

BACKGROUND OF THE INVENTION

The present embodiments relate to electronic circuits and are more particularly directed to performance control for such circuits, particularly in view of power and performance considerations arising in circuits with decreased transistor geometries.

Electronic circuits are prevalent in numerous applications and are used in devices in personal, business, and other environments. Demands of the marketplace affect many design aspects of these circuits, including device size, complexity, efficiency, and cost. These aspects are often important in various devices. By way of example, the mobile phone industry is transitioning from devices that are voice oriented to devices that are multimedia oriented, and multimedia applications typically integrate high performance processing cores. As a result, the above-mentioned aspects of size, complexity, efficiency, and cost manifest themselves in various areas, including energy consumption and battery lifetime. These areas are also a concern in various other electronic devices, particularly where energy is a concern such as in other battery-powered applications. Thus, to maintain pace with marketplace demands and supplier goals for these devices, considerations with respect to these factors are of paramount interest. The preferred embodiments are directed to these aspects.

Along with the proliferation of various electronic devices there is also an ongoing effort in the electronics industry to continue to reduce individual component sizes. This latter effort is sometimes described as sub-micron technology, when describing that the gate width of a single transistor on the electronic device is less than one micron. Of course, because a common electronic device is formed with an increasingly large number of transistors, then by reducing the width of each such device, the overall electronic device is reduced in size. Indeed, transistor widths are now reducing in size toward an area sometimes referred to as ultra-deep sub-micron, corresponding to an ongoing trend to further reduce the size of transistor gate widths. For example, current technology contemplates transistor gate lengths on the order of 90 nanometers, or even a lesser amount of 65 nanometers, with the expectation that even further size reductions are contemplated.

With the developments described above, the current state of the art uses two known techniques in an effort to control power consumption on certain devices. In a first technique, at certain times of operation, the global power supply voltage and frequency to the device are reduced. In a second technique, the threshold voltage of the transistors on the device is increased, such as by adjusting a back bias to each of the transistors. While each of these approaches has been used in the past to control power consumption, they have certain drawbacks that have been discovered by the present inventors in connection with the preferred embodiments, particularly as transistor geometries continue to decrease. By way of example, it has been observed that the first technique, reduction of the global power supply voltage, may actually cause an increase in total loss of energy per cycle when leakage current is taken into account. More particularly, it is known that for an overall integrated circuit and particularly in contemporary design, at a given time only a portion of the total circuit is operational, while the remaining transistors in the device remain at their respective non-switched states. This is increasingly the case for system-on-chip ("SOC") devices, where a number of different functional circuits are formed on a single integrated circuit die. On the SOC or a comparable device, the transistors that are temporarily not switched may leak current at a same time that the then-operating transistors are using functionally necessary current to switch state. The present inventors have observed that, for various reasons, the leakage of these non-switched transistors grows ever more considerable relative to the overall device as device geometries decrease. For example, with the reduction in transistor size, the transistor gate oxide, that is, the insulator between the transistor gate and the underlying semiconductor region, is thinner and, thus, current is more likely to leak through this thinner region. As another example, due to the SOC nature of a device as well as the goal of providing high speed switching devices, there is a lesser ability to temporarily isolate the non-switching transistors so as to avoid or reduce the effect of their current leakage. In any event, therefore, when total leakage current is taken into account for the SOC or like device, then lowering the global power supply voltage and as frequency decreases will actually cause more power consumption than if the supply voltage were left alone or as compared to power consumption at higher frequencies. Also in connection with smaller device geometries, the present inventors have observed that increasing transistor threshold voltages by adjusting back bias will moderately reduce power consumption in some instances, yet the amount of reduction may be further improved upon as is achieved with the preferred embodiments. Thus, the preferred embodiments are directed to these various aspects, as further detailed below.

BRIEF SUMMARY OF THE INVENTION

In one preferred embodiment, there is a power management system in an electronic device. The system comprises circuitry, responsive to at least one system parameter, for providing data processing functionality, where the circuitry for providing data processing functionality comprises a data path. The system also comprises circuitry for indicating a potential capability of operational speed of the data path. The system also comprises circuitry for adjusting the at least one system parameter in response to the circuitry for indicating a potential capability.

In another preferred embodiment, there is an alternative power management system in an electronic device. The system comprises circuitry, responsive to at least one system parameter, for providing data processing functionality, wherein the circuitry for providing data processing functionality comprises a data path. The system also comprises circuitry for indicating an amount of current leakage of the circuitry for providing data processing functionality. The system also comprises circuitry for adjusting the at least one system parameter in response to the circuitry for indicating an amount of current leakage Other aspects, circuits, systems, and methods are also disclosed and claimed.

BRIEF DESCRIPTION OF THE SEVERAL VIEWS OF THE DRAWING

FIG. 2b illustrates a timing diagram in connection with the operation of the block diagram of FIG. 2a.

DETAILED DESCRIPTION OF THE INVENTION

Figure 1:
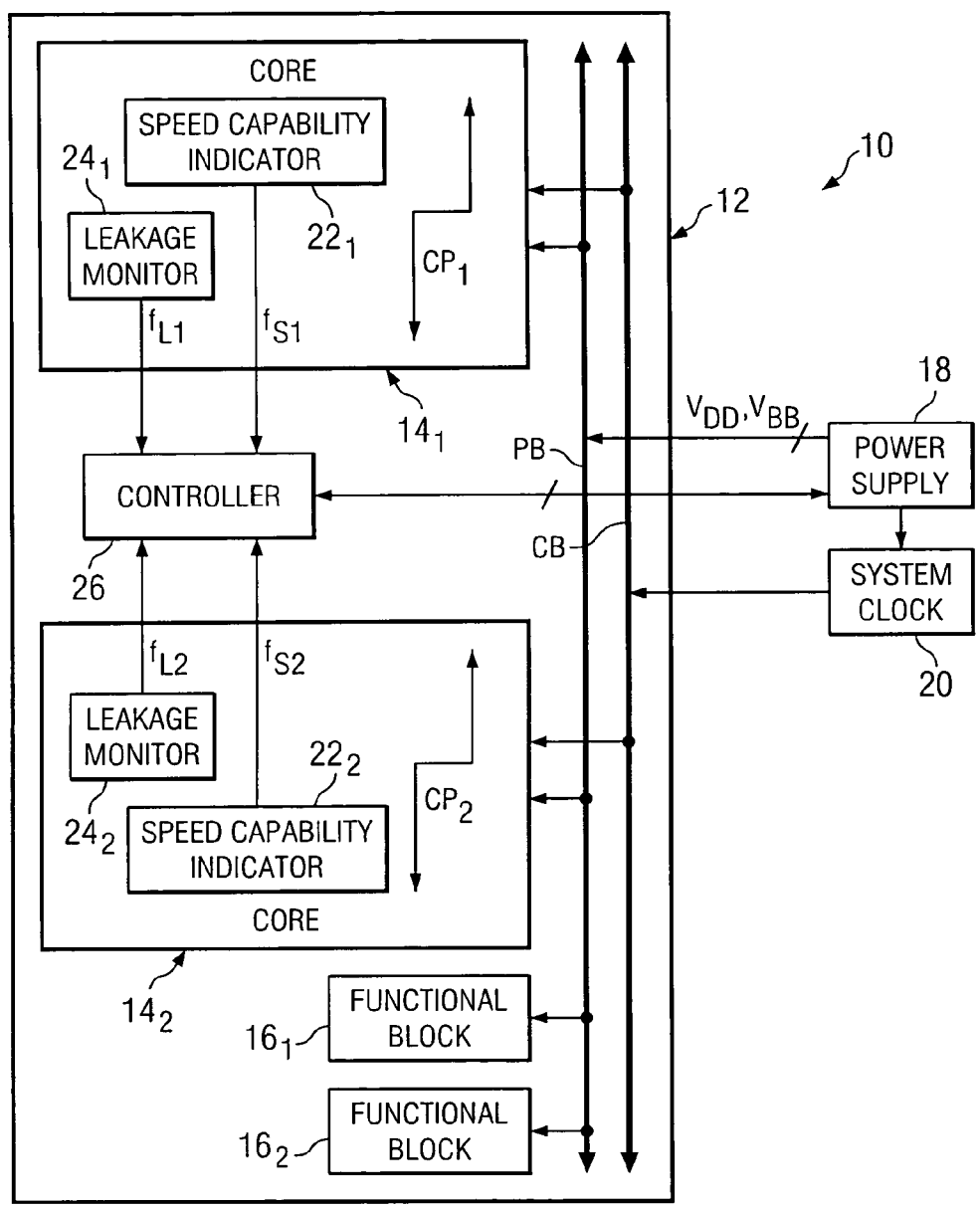
FIG. 1 illustrates a functional block diagram of a system 10 according to a preferred embodiment.

FIG. 1 illustrates a functional block diagram of a system 10 according to a preferred embodiment. System 10 may represent any of various different types of electronic devices, where those devices provide functionality through the use of one or more integrated circuit devices. Indeed, as indicated in the preceding Background Of The Invention section of this document, the preferred embodiments have particular benefit in devices where power and energy consumption are considerations, such as in mobile phones and other battery-operated devices, so system 10 may represent a portion of any one of those devices. In a general sense, various aspects of system 10 are known in the art, as are variations that may be ascertained by one skilled in the art, where those variations are also contemplated as within the present inventive scope. Thus, the following first describes these known aspects by way of introduction, followed by a detailed discussion of aspects which in combination with the known aspects provide for the inventive preferred embodiments.

System 10 is shown by example to include one system-on-a-chip ("SOC") block 12, which represents a single integrated circuit device that encompasses various functionality. With respect to that functionality, and by way of example, SOC block 12 is shown to include two different cores $14_1$ and $14_2$, each representing an example of certain major functions associated with SOC block 12. For example, core $14_1$ could be a general purpose microprocessor core, while core $14_2$ could be a digital signal processor ("DSP") core; however, alternative functioning blocks as well as a different number of functional blocks could be implemented and benefit from the inventive teachings of this document. In addition to cores $14_1$ and $14_2$, SOC block 12 may include additional functionality such as supportive or ancillary functionality with respect to cores $14_1$ and $14_2$. As an illustration in this regard, SOC block 12 is also shown to include two functional blocks $16_1$ and $16_2$, where the choice of two such blocks is solely by way of example.

Each functioning circuit of SOC block 12, including cores $14_1$ and $14_2$ and functional blocks $16_1$ and $16_2$, is connected to receive a power supply voltage from a power supply 18, through a power bus PB. In one approach, the same power supply voltage is provided to all of these circuits via power bus PB, and in an alternative approach power bus PB may have multiple conductors whereby different voltages may be supplied to different circuits within SOC block 12. Power bus PB is intended to be connected in a manner to provide, from power supply 18, a general system bias voltage, $V_{DD}$, to the circuits to which it is connected. As known in the art, therefore, the system bias voltage, $V_{DD}$, may be connected to various devices, such as selected source, drain, and/or gate nodes of various transistors within system 10. In addition, however, and for reasons more evident below, power bus PB is also intended to be connected in a manner to provide, from power supply 18, a threshold voltage altering system back bias voltage, $V_{BB}$, to the back gates or other appropriate threshold voltage connections of at least some of the transistors in the various circuits to which power bus PB is connected. Further in this regard, while a single back bias voltage, $V_{BB}$, is shown, in the preferred embodiment two separate back bias voltages are provided, one for p-channel transistors and one for n-channel transistors, where as known in the art a different amount of voltage adjustment is required to cause an equal change in the threshold voltage of these different conductivity type devices. Note also that in the example of FIG. 1, power supply 18 is shown external from SOC block 12 as is common in contemporary applications. However, the preferred embodiments also contemplate that when feasible as may be ascertainable by one skilled in the art, power supply 18 may be integrated within the same single integrated circuit that forms SOC block 12. Lastly, for sake of simplicity, power supply 18 is only shown as providing one system value of $V_{DD}$ and one system value of $V_{BB}$. However, the preferred embodiments also contemplate, when feasible, providing different sets of $V_{DD}$ and $V_{BB}$. such as one set of $V_{DD}$ and $V_{BB}$ to core $14_1$ and a separately adjustable and, thus, potentially., different, set of $V_{DD}$ and $V_{BB}$ to core $14_2$.

Each functioning circuit of SOC block 12, including cores $14_1$ and $14_2$ and functional blocks $16_1$ and $16_2$, is connected to receive a system clock signal, via a clock bus CB, from a system clock 20. In general, the frequency of the system clock signal governs the speed of operation of the circuits receiving that signal. System clock 20 also receives a voltage supply from power supply 18. Also, as known in the art, the frequency of the clock signal provided by system clock 20 to clock bus CB is changed from time to time, typically under the control of the system operating system. Lastly, note by way of example that system clock 20 is shown to be external from SOC block 12, but in an alternative embodiment it may be integral within SOC block 12.

Turning now to various aspects of SOC block 12 as distinguishable from the prior art, in the preferred embodiment each core $14_x$ includes two additional corresponding circuits, where each of those circuits is now introduced and as shown later where the combination of those circuits provides for enhanced performance control of system 10 in the form of energy savings and/or processing capability. Looking then to the two additional circuits in core $14_1$ by way of example, they include a speed capability indicator $22_1$ and a leakage monitor $24_1$. Additionally, having introduced speed capability indicator $22_1$ and leakage monitor $24_1$, note that core $14_2$ includes comparable devices, namely, a speed capability indicator $22_2$ and a leakage monitor $24_2$. These devices perform the same functions, relative to core $14_2$, as described with respect to each counterpart in core $14_1$. Further, SOC block 12 includes a controller 26, which is shared in the sense of signal evaluation and functionality between cores $14_1$ and $14_2$. Lastly, note that with certain variations as ascertainable by one skilled in the art, in alternative embodiments a different number of speed capability indicators and/or leakage monitors may be implemented as within the present inventive scope.

Looking in detail to speed capability indicator $22_1$, it is constructed and operates in response to system voltages $V_{DD}$ and $V_{BB}$ to provide resultant voltage and speed characteristics that in general mimic the voltage and speed characteristics of the critical path in core $14_1$. More particularly, a critical path is identifiable in a core as is known in the art, such as through the use of various diagnostic software during the development of the core design. Typically, a critical path provides the most restrictive bottleneck to the data processing of a given circuit. For sake of illustration, such a critical path for core $14_1$ is shown generally as a critical path $CP_1$. In the preferred embodiment, with that core critical path $CP_1$ identified, speed capability indicator $22_1$ is designed and formed as a circuit that is preferably much smaller than critical path $CP_1$, where this smaller circuit that forms speed capability indicator $22_1$ operates in response to the same system voltages $V_{DD}$ and $V_{BB}$ as critical path $CP_1$, but where speed capability indicator $22_1$ is designed to repeatedly switch state at a rate that is responsive to those two system voltages. This switching rate, or frequency, or a signal responsive to it, is provided by an output signal that is a measure of that switching rate, where in one preferred embodiment the switching rate is output directly as an output frequency, $f_{S1}$; in alternative embodiments, however, different measures of the switching rate may be provided, such as by outputting a digital count of or proportional to the switching rate. In any event, in the preferred embodiment wherein $f_{S1}$ is a frequency signal, the switching rate of $f_{S1}$ is governed by a feedback control in speed capability indicator $22_1$ and not the system clock from clock bus CB. Thus, variations in $V_{DD}$ and/or $V_{BB}$ can affect $f_{S1}$, while $f_{S1}$ is not affected by the system clock from clock bus CB. Nonetheless, according to one preferred embodiment, and due to the attempt to match the characteristics of speed capability indicator $22_1$ with those of core critical path $CP_1$, then typically it is anticipated that the frequency capability of speed capability indicator $22_1$ will mimic that of critical path $CP_1$ of core $14_1$, that is, for a given system voltage $V_{DD}$ and a given system back bias voltage $V_{BB}$, critical path $CP_1$ will be expected to operate at a frequency that is close to, or the same as, the switching frequency, $f_{S1}$, of speed capability indicator $22_1$. Further, in an alternative preferred embodiment, switching frequency, $f_{S1}$, gives a downward-scaled indication of critical path speed, so as to reduce power consumption of that indicator. For example, in one preferred embodiment, an explicit frequency divider may be included in speed capability indicator $22_1$ so as to reduce the resulting switching frequency, $f_{S1}$, which by way of example may be reduced to represent a speed that is 50% of that expected of critical path $CP_1$.

In the preferred embodiment, various aspects are implemented in an effort to ensure the likeness of voltage/frequency characteristics as between core critical path $CP_1$ and speed capability indicator $22_1$. As one aspect, in the preferred embodiment various design software, as available in the art, is operable to receive the network node listings or the like of critical path $CP_1$ and to provide a physically smaller design for speed capability indicator $22_1$, that is, for a smaller circuit that provides comparable voltage and frequency response to that of critical path $CP_1$. With respect to the size difference between critical path $CP_1$ and speed capability indicator $22_1$, for 65 nm technology, critical path $CP_1$ may be on the order of 500 μm in one dimension along an integrated circuit while speed capability indicator $22_1$ is by way of comparison on the order of 50 μm in one dimension along an integrated circuit; speed capability indicator $22_1$ is therefore less than or equal to approximately ten percent in size relative to critical path $CP_1$. Also using such software, in the preferred embodiment various iterations are repeated at the design stage so as to fine tune the voltage and frequency characteristics of speed capability indicator $22_1$ to approach those of critical path $CP_1$ in core $14_1$, or scaled values thereof. In addition, however, in the preferred embodiment speed capability indicator $22_1$ is a tunable circuit, that is, provisions are made so that after it is implemented as a semiconductor device, additional tuning (or "trimming") may be made to the circuit so as to further refine its voltage/frequency characteristics to duplicate those of critical path $CP_1$ in core $14_1$. This ability to tune may be implemented in various manners as ascertainable by one skilled in the art, and indeed may be done in a manner such that digital tuning values can be loaded into speed capability indicator $22_1$ after fabrication so as to accomplish a high degree of precision in the ability to tune the circuit as well as to provide simplicity and compactness as compared to other methods of trimming (e.g., tunable capacitors). As another aspect, speed capability indicator $22_1$ is located proximate the corresponding critical path $CP_1$ in core $14_1$. For example, for 90 nanometer technology, then the distance between speed capability indicator $22_1$ and critical path $CP_1$ is preferably less than 100 μm As another aspect, in the preferred embodiment speed capability indicator $22_1$ is constructed to be approximately square in layout along the semiconductor device that forms SOC block 12. Note that the proximity and layout preferences are implemented in an effort to have the same factors, such as process and operational factors, comparably influence both critical path $CP_1$ in core $14_1$ and speed capability indicator $22_1$. For example, process variations, which cause peaks and valleys in operational aspects in both of the two dimensions laterally across the semiconductor device, will preferably influence both critical path $CP_1$ in core $14_1$ and speed capability indicator $22_1$ in a comparable manner. As another example, temperature variations will preferably influence both critical path $CP_1$ in core $14_1$ and speed capability indicator $22_1$ in a comparable manner. In any event, therefore, once speed capability indicator $22_1$ is properly tuned, it is thereafter anticipated that in ideal conditions it will switch state, as reflected in $f_{S1}$, at a rate that is the same as (or proportional to) the rate of operation for the corresponding core $14_1$. However, under non-ideal conditions, and as detailed later, the corresponding core $14_1$ may operate at a different rate (taking into any scaling, if applicable) than reflected in $f_{S1}$, and this difference forms a basis in the preferred embodiments by which performance may be adjusted to improve overall efficiency.

Looking in detail to leakage monitor $24_1$, it is constructed and operates to provide a signal indication, $f_{L1}$, representing the amount of current leakage in the corresponding core $14_1$; by way of preferred examples, this indication may be a signal, such as a signal having a frequency or a count, that is either proportional to the leakage directly or that provides a ratio of the leakage current relative to the active current. Such a leakage circuit may be designed by one skilled in the art. By way of example and as guidance in this endeavor, FIG. 2a illustrates a simplified example of a block diagram of certain components that may be used to provide such functionality, and since that block diagram may represent either leakage monitor $24_1$ or $24_2$, it is shown generally as a leakage monitor $24_x$. Leakage monitor $24_x$ includes an active and leakage mimic block 100, which is so named because it includes circuitry sufficient to mimic the active and leakage behavior of the corresponding core $14_x$ that monitor $24_x$ seeks to represent in terms of a leakage current indication. Note that the specific design for mimic block 100 in the preferred embodiment is preferably integrated into some part of the automated design of the corresponding circuit core, which in this regard is comparable to that of the design of a speed capability indicator $22_x$. In other words, for a given design and the software that produces it, that same software may be modified so as to produce, such as from the network list of the core design, a comparable design for a simplified circuit that produces leakage consistent with the corresponding core, where that circuit thus forms mimic block 100. Thus, for all integrated circuits sharing a same design, each will also share a comparable design of a corresponding mimic block 100 to be included in a leakage monitor $24_x$ (or multiple such monitors if more than one is desired). Mimic block 100 receives the same system bias voltage, $V_{DD}$, as provided to core $14_x$ (see FIG. 1) and from a node 102 that is connected to a source of an n-channel transistor 104. N-channel transistor 104 has its drain connected to an output $106_1$, of a current mirror 106 and its gate connected to the output of an amplifier 108. The non-inverting input of amplifier 108 is connected to receive the system bias voltage $V_{DD}$ and the inverting input of amplifier 108 is connected in a feedback manner to node 102; thus, one skilled in the art will appreciate that this configuration therefore causes the voltage $V_{DD}$ at the non-inverting input to be duplicated at node 102. Returning to mimic block 100, it also preferably receives the system back bias voltage, $V_{BB}$, for application to desired back gates therein, and also a clock signal from an output of an OR gate 110. OR gate 110 has two inputs, the system clock signal CLK from bus CB (see FIG. 1) and a STOPCLK signal, which is further described later.

Continuing the description of FIG. 2a, current mirror 106 receives a voltage source signal designated $V_{DDA}$, which preferably is the source supply for any related analog circuitry and which is also used to supply voltage to amplifier 108. Voltage $V_{DDA}$ is larger than $V_{DD}$ so as to properly achieve the functionality detailed later. Current mirror 106 includes another output $106_2$ connected to a current mirror 112 and another output $106_3$ that may be contacted by the switching end of a switch 114. The switching end of switch 114 also may be connected to a node 116 that is also connected to current mirror 112. Switch 114 is further connected to a node 117, where between node 117 and ground is connected a capacitor 118, and where node 117 is further connected to an input $120_1$ of a comparator 120. A second input $120_2$ of comparator 120 is connected to receive a reference voltage, $V_{ref}$. The output of comparator 120 is connected to a controller 122 and, more particularly, to control the starting and resetting of a counter 124 in controller 122. Controller 122 also receives the system clock CLK from clock bus CB, while it provides a switch control signal SW_CTRL to switch 114 and the STOPCLK signal to OR gate 110. Lastly, controller 122 outputs a signal $f_{Lx}$, which is intended to represent either $f_{L1}$ or $f_{L2}$ shown in FIG. 1, but is shown more generically as $f_{Lx}$ in FIG. 2a so as to correspond to the generic indication of the respective leakage monitor $24_x$. Accordingly, $f_{Lx}$ may be monitored to provide a signal representing the amount of leakage current in monitor $24_x$, as further appreciated below.

Figure 2B:
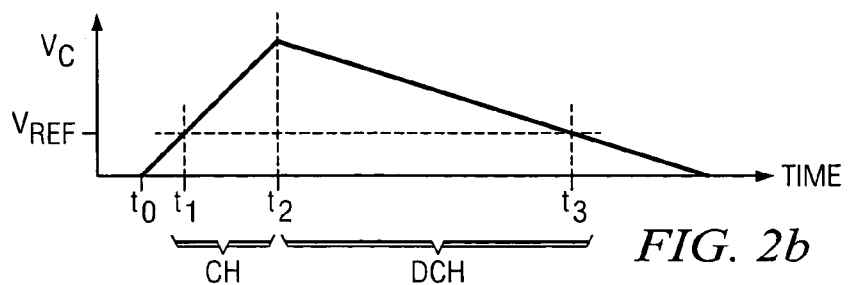
Figure 2A:
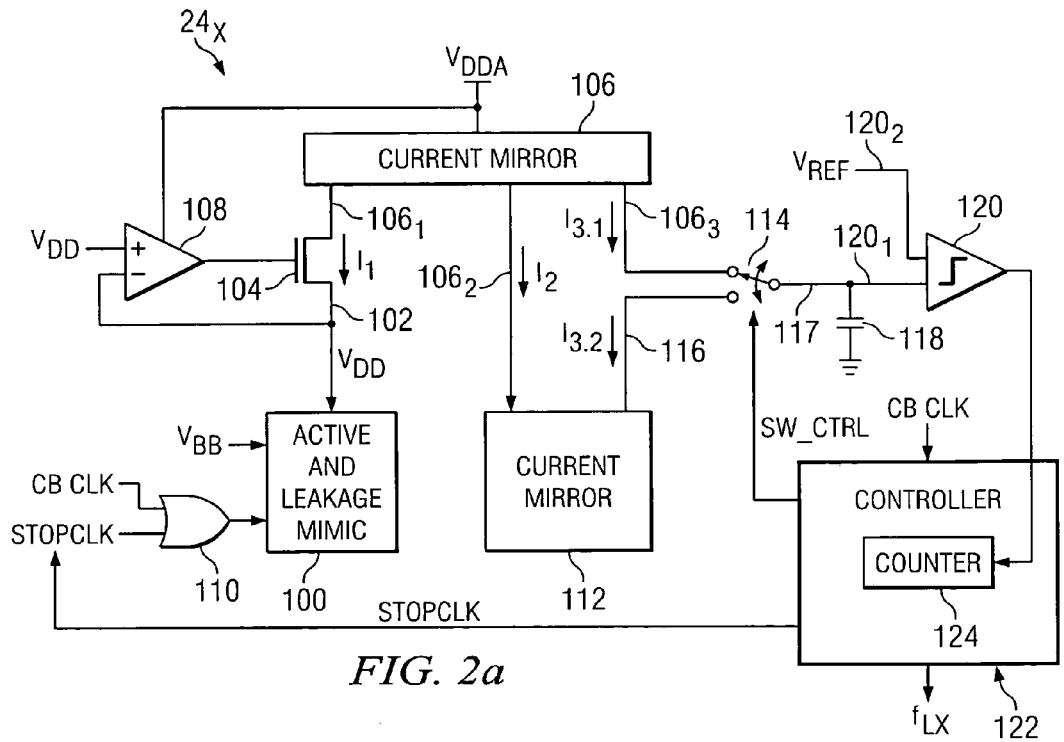
FIG. 2a illustrates a simplified block diagram of certain components that may be used to provide the functionality of either leakage monitor $24_1$ or $24_2$ of FIG. 1.

The operation of leakage monitor $24_x$ is now explored in connection with both FIGS. 2a and 2b. Introducing then FIG. 2b, it illustrates a plot of a voltage, $V_C$, across capacitor 118, over time. With transistor 104 operating, a current $I_1$ passes through its source/drain conductivity path. Initially, assume that the STOPCLK signal as input to OR gate 110 is de-asserted low, so that OR gate 110 passes, to mimic block 100, the CLK signal at its other input; at this time, therefore, mimic block 110 mimics the active operation of a corresponding core $14_x$ and uses current $I_1$ as its active current. Further, the current $I_1$ is mirrored, by current mirror 106, at output $106_2$ in the form of current $I_2$. Also at this time, assume that switch 114 is in its upward position, as shown in FIG. 2a. In response, current $I_2$ is mirrored, by current mirror 106, at output $106_3$ in the form of current $I_{3.1}$; moreover, that current $I_{3.1}$ stores charge across capacitor 118 and, thus, the voltage $V_C$ across that capacitor begins to rise as shown following time $t_0$ in FIG. 2b. As $V_C$ rises, at a time $t_1$ it reaches and thereafter surpasses $V_{ref}$; at this time, comparator 120 outputs a first state to controller 122, thereby causing counter 124 to begin to count. In the preferred embodiment, counter 124 counts for a predetermined number of system clock CLK cycles, as shown as CH cycles between times $t_1$ and $t_2$ in FIG. 2b.

Continuing with the operation of leakage monitor $24_x$, at time $t_2$, that is, after CH cycles of CLK, controller 122 asserts the STOPCLK signal high, resets the count in counter 124, and transitions the switch control signal SW_CTRL so that switch 114 moves to its downward position, that is, opposite of that shown in FIG. 2a. At this point; therefore, the assertion of STOPCLK causes OR gate 110 to present a constant high clock signal to mimic block 100, thereby holding it in one state. Thus, mimic block 100 at this point represents the state during stopped operation, that is, it will mimic the leakage of current through the corresponding core $14_x$. Thus, the current $I_1$ now used by mimic block 100 is representative of current leakage through core $14_x$. Moreover, again, current $I_1$ is mirrored, by current mirror 106, in the form of current $I_2$ to current mirror 112. Further, current $I_2$ is mirrored, by current mirror 112, in the form of current $I_{3.2}$, where the voltage $V_C$ across capacitor 118 begins to discharge at a rate reflected in current $I_{3.2}$. Thus, current $L_{3.2}$ is proportional to the leakage current through mimic block 100. During the time of discharge of voltage $V_C$ following time $t_2$, counter 124 accumulates a new count; once the voltage $V_C$ across capacitor 118 reaches and thereafter falls below $V_{ref}$, which is shown at time $t_3$ in FIG. 2b, then comparator 120 changes its output state, thereby stopping the count in counter 124. The total count in counter 124 at time $t_3$ is referred to herein as M counts, as also shown in FIG. 2b. Thus, by time $t_3$, leakage monitor $24_x$ is informed of the time (CH cycles) for capacitor 18 to charge to a certain voltage during active current usage as well as the time (DCH cycles) for capacitor to discharge from that certain voltage during leakage current usage. Given the preceding, one skilled in the art will appreciate that a ratio may be provided between the N counts and the M counts, with the result providing a relative indication of the active use current relative to the leakage current. This ratio is provided by the signal $f_{Lx}$ and, thus, indicates an amount of current leakage in mimic block 100 and, hence, also in core $14_x$. Thus, the ratio effectively a digital value, converted from the analog provision of mirrored currents, to represent leakage current. Further, while FIG. 2a illustrates one such approach, one skilled in the art may ascertain various alternatives.

Returning to FIG. 1 and applying the observations from FIGS. 2a and 2b to a core $14_x$ then according to the preferred embodiment each leakage monitor $24_x$ preferably operates in a similar capacity, that is, to provide a signal representing either directly or proportionally an amount of current leakage in the respective core $14_x$. Particularly, note that mimic block 100 is preferably designed and located in manner to reflect a comparable amount of leakage as the leakage that is then occurring in the remaining functional transistors in the corresponding core $14_x$. In other words, given the relatively small space in which a core $14_x$ is constructed and the large number of transistors therein as well as the various different possible functions of different ones of those transistors, then at any given time some percentage of the overall number of transistors will be in a non-conducting and non-switching state, and those transistors will leak current thereby causing a commensurate amount of power consumption. Mimic block 100 is therefore designed and constructed to reflect a proportionate indicator of the amount of this leakage current and, therefore, the signal $f_{Lx}$ represents not only the amount of current leakage within a leakage monitor $24_x$, but it likewise represents the amount of current leakage in the corresponding core $14_x$. Still further, while separate leakage monitors $24_1$, and $24_2$ are shown in the preferred embodiment, in an alternative preferred embodiment a single such monitor may be provided for the entire SOC block 12, or as still other embodiments more than two such monitors may be included. Lastly, note tat the signal $f_{Lx}$ may be provided in various forms. In one form, it may have a frequency, where the amount of signal transitions over a period of time may be counted and the magnitude of the count thereby provides a digital representation proportional to the amount of current leakage. In another form, the signal may be a ratio between current leakage and active leakage, as discussed above in connection with FIGS. 2a and 2b.

Figure 3:
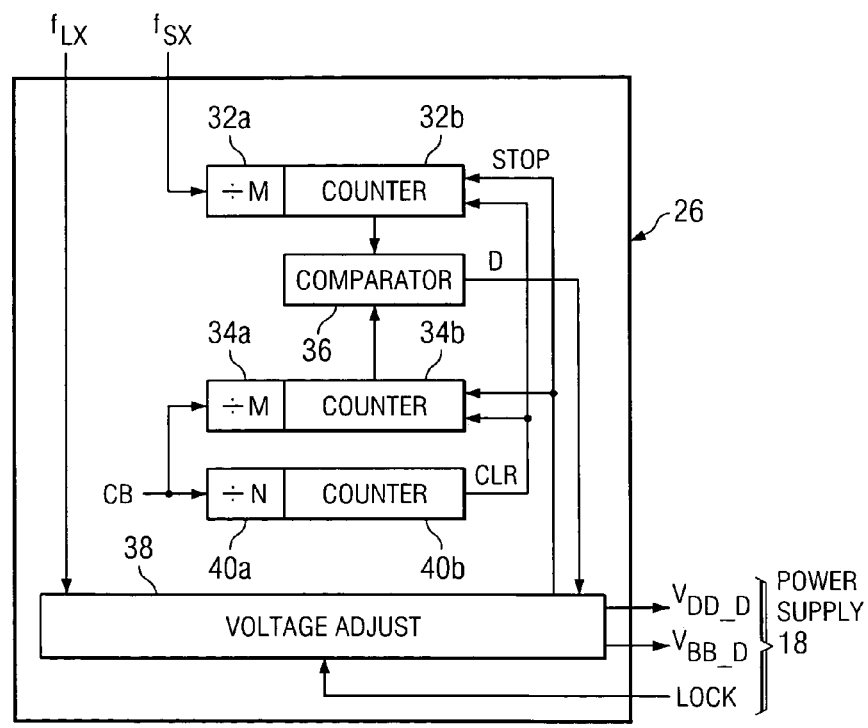
FIG. 3 illustrates a functional block diagram of controller 26 of FIG. 1.

Turning now to FIG. 3, it illustrates controller 26 in detail, which preferably is constructed and operates to process the signals, $f_{Sx}$ and $f_{Lx}$, from both sets of speed capability indicators $22_1$ and $22_2$ and leakage monitors $24_1$ and $24_2$. For sake of discussion, however, the following discussion first considers controller 26 as considering only one set of $f_{Sx}$ and $f_{Lx}$ from the speed capability indicators $22_x$ and leakage monitor $24_x$ of a single core $14_x$, where a later discussion contemplates the processing of those signals from both core $14_1$ and $14_2$. Turning to the details of FIG. 3, frequency signal $f_{Sx}$ is connected as an input to a divider 32a that divides the frequency of that signal by a value M, and the result is provided to a counter 32b. The system clock signal is connected, from clock bus CB, as an input to a divider 34a that divides the frequency of that signal by the same value M as used by divider 32a, and the result is provided to a counter 34b. The counts from both of counters 34a and 34b are connected as inputs to a comparator 36. Comparator 36 compares these count values to one another so in effect comparator 36 is comparing a measure of the frequency signal representing the speed capability (i.e., counter 32b) with a comparable measure the frequency of the system clock (i.e., counter 34b), where the comparison is simplified by comparing a scaled version (i.e., scaled by M) of each of these values. Note also that if frequency signal $f_{Sx}$ is scaled, as described above, by applying including a frequency divider in speed capability indicator $22_x$, then an appropriate modification is made, such as by doubling the count in counter 32b if a 50% reduction is made in the output of $f_{Sx}$ to correspond to the divider in speed capability indicator $22_x$. In any event, in response to its comparison, comparator 36 outputs a difference signal, D, indicating the difference between the counts in counters 32b and 34b. Note also that in an alternative embodiment counters 32b and 34b and comparator 36 are replaced with an up-down counter, whereby frequency signal $f_{Sx}$ causes an advancement of the up-down counter in one direction (e.g., increment), while the system clock from clock bus CB causes an advancement of the up-down counter in the opposite direction (e.g., decrement). As a result, the ultimate count in such an up-down counter also represents the difference signal, D.

Turning to the response to the difference signal; D, it is connected as an input to a voltage adjust circuit 38, which also receives as an input the signal, $f_{Lx}$, from the corresponding leakage monitor $24_x$. Voltage adjust circuit 38 may be constructed by one skilled in the art to achieve the functionality described in this document, with such construction being selected from various different combinations of available hardware and/or software, including by way of example a state machine in combination with circuitry (e.g., digital filter) to respond to the various inputs and to provide the described outputs. Also in this regard, voltage adjust circuit 38 is shown to provide two digital voltage indication signals, $V_{DD\_D}$ and $V_{BB\_D}$, to power supply 18, where as shown below these signals can cause changes in the power supply voltages $V_{DD}$ and $V_{BB}$, respectively. Moreover, with respect to the latter digital signal, $V_{BB\_D}$, recall from earlier that the preferred embodiment provides one back bias voltage to the p-channel transistors and another back bias voltage to the n-channel transistors in each core $14_x$. Consistent with these two voltages, therefore, in the preferred embodiment the digital signal $V_{BB\_D}$ includes two different digital signals, one to correspond to the back bias voltage for the p-channel transistors and one to correspond to the back bias voltage for the n-channel transistors. Voltage adjust circuit 38 also receives a LOCK signal from power supply 18. Finally, controller 26 includes an additional divider 40a that also receives the system clock signal from clock bus CB, and divider 40a divides the frequency of that signal by a value N; the result is provided a to a counter 40b, which is operable to provide a clear signal ("CLR") and a STOP signal to both counters 32b and 34b.

The preferred operation of controller 26 is now discussed. Counter 40b governs each cycle of operation for controller 26 by counting toward a threshold, where this may be achieved by using a decrementing counter which reaches a threshold of zero or by using a wraparound (or modulo) counter that is considered to reach a threshold each time it returns to zero or some other value. In any event, when counter 40b reaches its threshold, the CLR signal is asserted thereby clearing the values in both counters 32b and 34b, after which both counters being counting in response to their respective inputs. The periodicity of CLR being asserted to periodically clear the counters in this manner is adjustable by the value of N given the then-existing clock frequency provided by clock bus CB. For example, if the system clock is at 250 MHz, and N=10, then counter 40b counts at 25 MHz. With this counting rate, a threshold is associated with counter 40b such that once the threshold is reached, CLR is asserted. At the same time, which therefore also continues after counters 32b and 34b are cleared, speed capability indicator $22_x$ reports a frequency $f_{Sx}$, which recall represents the speed, either directly or scaled downward, at which the relatively small circuit in that indicator transitions (or "oscillates") at the then-existing voltages for $V_{DD}$ and $V_{BB}$, and that frequency is scaled downward by M and counted by counter 32b. For example, assume during this time period that given the then-existing $V_{DD}$ and $V_{BB}$, frequency $f_{Sx}$=500 MHz, and assume M=5, then counter 32b counts at a rate of 100 MHz. During the same time, the system clock signal provided by clock bus CB is scaled by M and that frequency is counted by counter 34b. For example, continuing with the assumption that the system clock is at 250 MHz, then counter 34b counts at a rate of 50 MHz (i.e., 250

MHz/5=50 MHz). At some point, also determined by the count in counter 40b, STOP is asserted and the counts in counters 32b and 34b are compared by comparator 36. In the present example, because the count rate of those counters are 100 MHz and 50 MHz, respectively, then the count in counter 32b will be twice that of the count in counter 34b. Thus, these values are compared by comparator 36 and the resulting difference, D, is provided to voltage adjust circuit 38.

In the preferred embodiment, voltage adjust circuit 38 is operable to analyze the difference, D, either alone or in combination with the leakage signal $f_{Lx}$, and to cause an adjustment in the system voltages $V_{DD}$ and $V_{BB}$ in response to this analysis, where the adjustments are made by issuing counterpart digital voltage indication signals, $V_{DD\_D}$ and $V_{BB\_D}$, respectively. In general and as appreciated from the following, these adjustments permit the overall operation of a corresponding core $14_x$ to be adjusted so as to improve the performance efficiency, such as by providing a more optimal amount of energy consumption for a given system clock frequency. To appreciate these aspects in greater detail, the following first provides two examples where the leakage signal $f_{Lx}$ is not considered, leaving only the speed capability indicator frequency, $f_{Sx}$, and the system clock frequency, as bases for making adjustments to improve energy efficiency. Thereafter, an additional discussion is provided to further include considerations with respect to the leakage signal $f_{Lx}$. Further, once an adjustment is made, CLR is asserted, thereby clearing both counters 32b and 40b. Thereafter, STOP is de-asserted and those counters again begin counting, again in response to $f_{Sx}$ and the system clock on clock bus CB, respectively. Next, the above-described methodology is repeated, that is, STOP is asserted and the difference signal, D, is determined. Accordingly, in the preferred embodiment this entire process may be repeated numerous times (or indefinitely) while system 10 is operating. Consequently, there is an ongoing, periodic, and dynamic evaluation of the difference, D, at different times, with each instance representing a potential adjustment to $V_{DD}$ and $V_{BB}$ in response to that difference. As a result, there is continuous management and optimizing of the energy consumption of system 10.

Looking at a first example of the above-introduced operation, assume at a first time, $t_1$, that $f_{Sx}$, as processed through counter 32b, indicates a speed capability of frequency at 500 MHz, while at the same time assume that the system clock frequency, as processed through counter 34b, indicates a then-existing core operational frequency of 250 MHz; recall also that the difference between these two frequencies, after scaling, is reflected in the difference signal, D, to voltage adjust circuit 38. According to the preferred embodiment, these frequencies and, thus, the scaled difference, D, between them, effectively provide a comparison of the then-operating frequency of core $14_x$ (as caused by the system clock) with the potential capability of what frequency that core could operate at if left to transition freely in response to $V_{DD}$ and $V_{BB}$, as reflected infix; in other words, recall that $f_{Sx}$ is provided by a speed capability indicator $22_x$ which is designed to mimic the voltage/frequency characteristics of core $14_x$ if it were operated independent of the system clock. In effect, therefore, for the present example, the 500 MHz indicated by $f_{Sx}$ represents that system voltages $V_{DD}$ and $V_{BB}$ provide sufficient power to support a capability of 500 MHz of core operation due to the likeness of the core critical path relative to speed capability indicator $22_x$, even though the core at time $t_1$ is operating at 250 MHz. From this observation, therefore, it is effectively plausible that a lesser voltage may be used to support the then-required core operating frequency of 250 MHz, that is, the current states of the system voltages $V_{DD}$ and $V_{BB}$ as of time $t_1$ are sufficient to drive 500 MHz of operation, when at that time there is only the need to support 250 MHz of operation. As a result, since voltage adjust circuit 38 is made aware of these factors by way of the difference signal, D, then voltage adjust circuit 38 operates to cause an adjustment in one or both of the system voltages $V_{DD}$ and $V_{BB}$. Particularly in this regard, voltage adjust circuit 38 provides digital values $V_{DD\_D}$ and $V_{BB\_D}$ to power supply 18, thereby causing power supply 18 to adjust $V_{DD}$ and $V_{BB}$, respectively, in proportion to the digital indications. In the present example, therefore, by causing a reduction in $V_{DD}$ and/or an increase in $V_{BB}$, voltage adjust circuit 38 can continue to monitor the frequency signal $f_{Sx}$ and the then-existing frequency of the system clock, as both will continue to be reflected by new determinations of the difference, D. Once the difference, D, is sufficiently low or reaches zero, then it is known that the frequency signals is close to or matches the then-existing frequency of the system clock; at that point, therefore, voltage adjust circuit 38 has provided an improved adjustment to $V_{DD}$ and/or $V_{BB}$, that is, that is, energy consumption has been reduced versus the state where the difference, D, is a larger or non-zero value, yet the critical path of a core $14_x$ may continue to operate at a same frequency while consuming less energy.

While the preceding has demonstrated considering a single value of $f_{Sx}$ from a single speed capability indicator $22_x$, recall in FIG. 1 that controller 26 is connected to receive multiple values of $f_{Sx}$ from respective multiple speed capability indicators $22_x$. With these connections, various alternatives are contemplated within the present inventive scope. In one approach, controller 26 may operate to cause local voltages for $V_{DD}$ and $V_{BB}$ to be supplied to different local cores, that is, one set of $V_{DD}$ and $V_{BB}$ may be caused to be supplied to core $14_1$ based on its speed capability indicator frequency $f_{S1}$, while another set of $V_{DD}$ and $V_{BB}$ may be caused to be supplied to core $14_2$ based on its speed capability indicator frequency $f_{S2}$. However, in some implementations, the use of different values of $V_{DD}$ (and $V_{BB}$) for a single chip such as SOC block 12 may prove too complex or otherwise undesirable, and thus instead controller 26 may implement some type of optimization as between receiving multiple values of $f_{Sx}$. For example, a conservative approach may be, in the instance of receiving multiple values of $f_{Sx}$, determining the difference, D, based on the value of $f_{Sx}$ that is closest to the clock frequency; in this manner, any subsequent adjustment will optimize toward that value, without over adjusting which might occur if the value of $f_{Sx}$ that were more distant from the clock frequency were used. Other manners of optimizing any adjustment, based on multiple values of $f_{Sx}$, may be ascertained by one skilled in the art.

Recalling that voltage adjust circuit 38 is also operable to analyze the difference, D, in combination with the leakage signal $f_{Lx}$, two examples in that regard are now explored. As a first example, assume at a time $t_3$ that $f_{Sx}$ indicates a speed capability of frequency at 500 MHz, while at the same time assume that the system clock frequency indicates a then-existing core operational frequency of 250 MHz, and again the scaled difference between these two frequencies is reflected in the difference signal, D, to voltage adjust circuit 38. Assume further that the leakage signal, $f_{Lx}$, indicates a relatively small amount of current leakage. With respect to this latter indication, note that a threshold (or more than one threshold) may be established as a basis of comparison to the leakage signal, $f_{Lx}$, such that if $f_{Lx}$ is below the threshold, then leakage is considered low, whereas if $f_{Lx}$ is above the threshold, then leakage is considered high. Returning then to the example wherein leakage is low, then preferably voltage adjust circuit 38 again provides digital values $V_{DD\_D}$ and $V_{BB\_D}$ to power supply 18, thereby causing corresponding voltage outputs from power supply 18 of $V_{DD}$ and $V_{BB}$; however, since leakage is low, the preferred embodiment directs a larger reduction in the magnitude of $V_{DD}$ (by changing $V_{DD\_D}$) as compared to the increase in the magnitude of $V_{BB}$ (by changing $V_{BB\_D}$). Indeed, having detected relatively low leakage, it may be preferable to only reduce $V_{DD}$ while leaving $V_{BB}$ unchanged. The preference of a greater adjustment to $V_{DD}$ versus $V_{BB}$ arises from the observation that by considerably increasing $V_{BB}$, the threshold voltage of the transistors affected may be such that additional leakage may be possible, which would be undesirable. Thus, the more dominant (or sole) change in this example is made by reducing $V_{DD}$. In contrast, assume as another example, at a time $t_4$, that the frequencies are the same as were the case at $t_1$ (i.e., system clock of 250 MHz, $f_{Sx}$=500 MHz), but at $t_4$ assume that the leakage signal, $f_{Lx}$, indicates a relatively large amount of current leakage. In this case, then preferably voltage adjust circuit 38 again provides digital values $V_{DD\_D}$ and $V_{BB\_D}$ to power supply 18, but since leakage is relatively high, the preferred embodiment directs a larger increase in the magnitude of $V_{BB}$ (by changing $V_{BB\_D}$) as compared to the decrease in the magnitude of $V_{DD}$ (by changing $V_{DD\_D}$). Indeed, it may be preferable to only increase $V_{BB}$ while leaving $V_{DD}$ unchanged. The preference of a greater adjustment to $V_{BB}$ versus $V_{DD}$ arises from the observation that by increasing $V_{BB}$, power consumption is reduced both by reducing current leakage and providing a total overall reduction in power available to drive core $14_x$. Lastly, recalling that controller 26 may operate in alternative embodiments with respect to either a single core or multiple cores when analyzing speed capability of those cores from the signal $f_{Sx}$, then similarly controller 26 may operate in alternative embodiments with respect to one ore more leakage monitor indications and resulting changes may be made to either global or local values of $V_{DD}$ and $V_{BB}$.

While the preceding has described preferred embodiments that adjust $V_{DD}$ and/or $V_{BB}$ in response to either or both of $f_{Sx}$ and $f_{Lx}$, the present inventive scope contemplates that other system parameters that are dynamically alterable also may be changed so as to affect the operation of a critical path and in response to either or both of $f_{Sx}$ and $f_{Lx}$. For example, an additional system parameter is the clock speed provided by system clock 20. In other words, in an alternative embodiment that speed may be made to be adjustable in response to either or both of $f_{Sx}$ and $f_{Lx}$. To illustrate this point, consider again the earlier example at a first time, $t_1$, wherein $f_{Sx}$ indicates a speed capability of frequency at 500 MHz, while at the same time assume that the system clock frequency indicates a then-existing core operational frequency of 250 MHz. Rather than adjusting $V_{DD}$, or in combination with adjusting $V_{DD}$, in an alternative embodiment the system clock frequency may be adjusted according to these indications. For example, in one approach, $V_{DD}$ may be left at its then-current level, while system clock 20 is controlled so that the clock speed is increased toward, or all the way to, a value of 500 MHz. In this manner, the core operational frequency is raised toward that of the perceived capable speed of 500 MHz, the latter of which is provided by $f_{Sx}$. Thus, in this approach, assuming $V_{DD}$ is not changed, then energy consumption is not reduced at time $t_1$, but performance is enhanced by increasing clock speed while leaving $V_{DD}$ and $V_{BB}$ undisturbed. Further, this adjustment may be combined with an adjustment to $V_{DD}$ and/or $V_{BB}$ for further optimization as may be desired. Also in connection with the preceding, it is noted that certain considerations may dictate a preference in some implementations of adjusting one system parameter or parameters while not changing others. For example, in contemporary applications, often an original equipment manufacturer or the like may specify certain parameters that may not be changed, for instance desiring that clock speed be left solely in control of their software. In such a case, dynamically altering the system clock as just described may not be preferable or permissible. In other instances, however, it may prove beneficial, particularly for speed demanding applications. Lastly, note that while the present document has described alterations in the system parameters consisting of $V_{DD}$, $V_{BB}$, and clock speed, one skilled in the art may ascertain other system parameters that may be dynamically adjusted in response to $f_{Sx}$ and/or $f_{Lx}$ with beneficial results and consistent with the present inventive scope.

Figure 4:
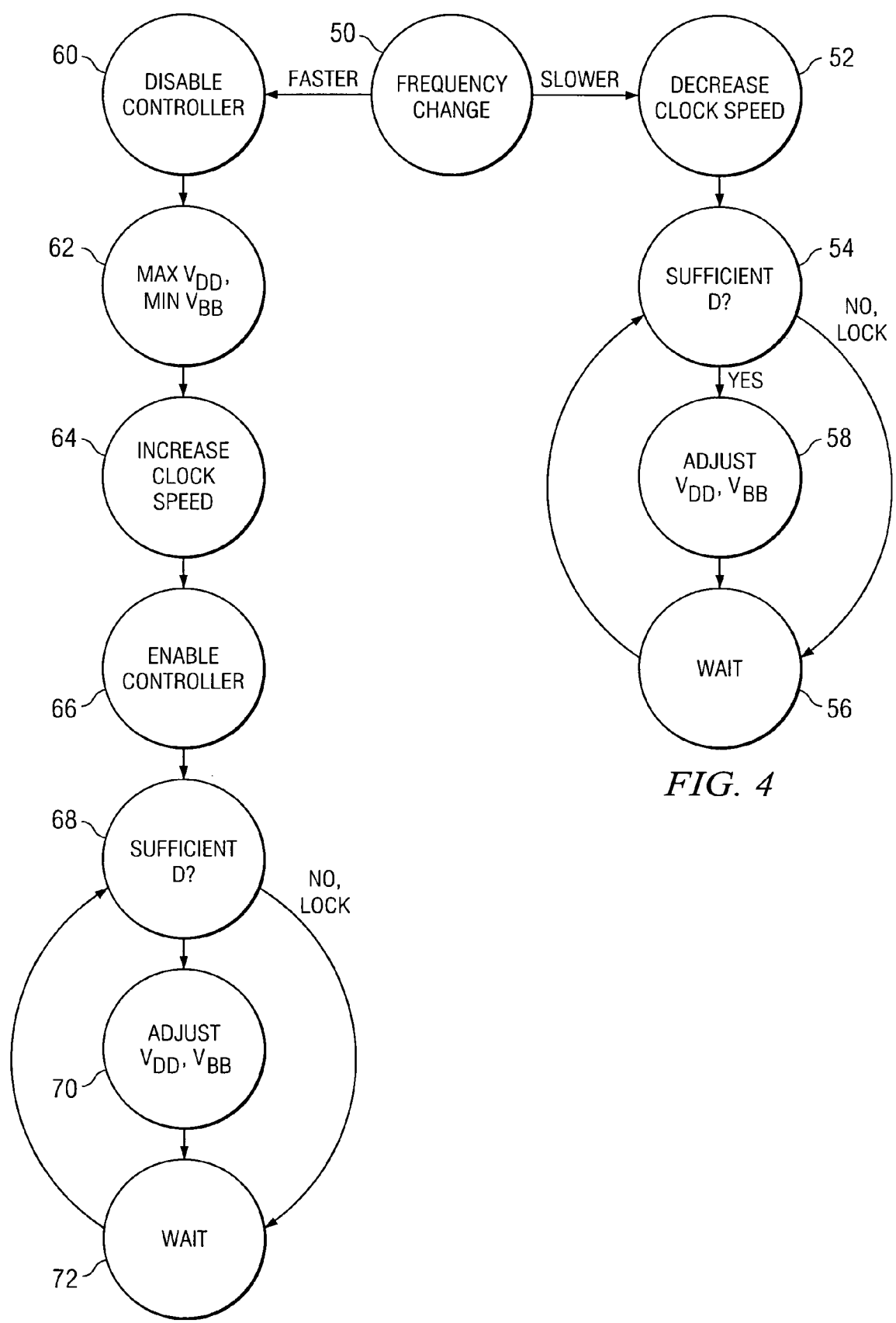
FIG. 4 illustrates a state diagram of an example of operation of controller 26 of FIG. 3.

FIG. 4 illustrates a state diagram of an example of operation of controller 26 of FIG. 1 and with the expectation that the reader is familiar with the examples set forth above so as to simplify the remaining discussion. In general, the state diagram of FIG. 4 assumes a steady state of operation where $V_{DD}$ and $V_{BB}$ are at set levels for SOC block 12, and thereafter a change in the frequency of system clock 20 is desired, such as may be the case under control of software or the operating system, and as may occur due to a task switch or the like. This requested change is represented by a state 50, and the request may be to decrease the system clock speed as shown to the right of state 50 or the request may be to increase the system clock speed as shown to the left of state 50. Each of these alternative paths is discussed below.

Looking to the states following an operating system request to decrease the system clock speed, following state 50 is a state 52, during which system clock 20 is controlled so as to achieve the desired decrease in clock speed. Thereafter, the control moves to state 54, in which the difference, D, provided by controller 26 is evaluated to see if it is sufficiently high so as to warrant an adjustment in the system voltage(s). This determination may be made by comparing the difference, D, to a threshold, and that threshold may be as low as zero. If the difference, D, is insufficient to warrant a voltage adjustment, then the state diagram proceeds to a wait state 56; additionally, power supply 18 issues a LOCK signal to voltage adjust circuit 38, which thereby acts as an acknowledgment that a steady state has again been achieved, given the reduction in clock speed from state 52. The LOCK may be used by voltage adjust circuit 38 to assert its STOP signal to counters 32b and 34b, thereby preventing those counters from counting during the time that STOP is asserted. At some point later, the STOP signal may be de-asserted and CLR asserted, at which time control leaves wait state 56 and returns to step 54, to once again determine and evaluate whether the difference, D, is at a sufficient level to warrant a voltage adjustment. If indeed the difference, D, is at such a level, then the control continues to state 58. State 58 represents the change to one or both of $V_{DD}$ and $V_{BB}$, consistent with the value of the difference, D, and also possibly in view of any leakage, as provided by the appropriate leakage monitor(s) as detailed above. Once such an adjustment is made, the flow continues to wait state 56 for a period of waiting, after which the difference, D, is again evaluated as the flow returns to step 54. Lastly, note in the preferred embodiment that state 52 preferably represents a step taken under control of software, including the operating system of system 10. However, in the preferred embodiment, steps 54, 56, and 58 are implemented in hardware so as to minimize the software interruption.

Looking to the states following a request to increase the system clock speed, following state 50 is a state 60, during which the request is communicated to controller 26. Thereafter, the flow continues to a state 62, at which time controller 26 maximizes $V_{DD}$ and minimizes $V_{BB}$; by making these adjustments, then initially the voltage difference between $V_{DD}$ and $V_{BB}$ is maximized so as to provide the largest possible drive current to thereby support a maximum rate of speed for a core $14_x$. Next, after the voltages of $V_{DD}$ and $V_{BB}$ settle, the flow continues to a state 64, during which system clock 20 is controlled, preferably by the operating system in response to the earlier-introduced change from state 50, so as to achieve the desired increase in clock speed. Thereafter, the control flows to state 66, during which controller 26 operates as detailed earlier. As a result, and as shown in the next state 68, controller 26 determines whether the difference, D, is sufficiently high so as to warrant an adjustment in the system voltage(s). Again, this determination may be made by comparing the difference, D, to a threshold. Thereafter, states 70 and 72 make the appropriate changes, if any, in $V_{DD}$ and $V_{BB}$ and wait for the next successive evaluation of the difference, D, in a comparable manner as described above with respect to states 56 and 58.

From the above, it may be appreciated that the above embodiments provide an integrated circuit dynamic parameter management structure and methodology that may be used with numerous electronic circuits. Indeed, the preferred embodiments have particular application to improve performance control in circuits with decreased transistor geometries. More particularly, and as detailed earlier, as transistor geometries decrease, it has been observed by the present inventors that a global reduction in $V_{DD}$ as frequency decreases, as implemented in the prior art, may actually increase overall energy consumption, such as by increasing device leakage. In contrast, certain preferred embodiments provide for alterations in device parameters, such as both $V_{DD}$ and $V_{BB}$, including in view of the then-resulting leakage, so these adjustments are made to counteract any tendency toward increased leakage. As a result, greater improvements in energy consumption can be achieved. As another benefit, greater performance and power efficiency may be realized for a given device size and complexity. As still another benefit, battery-powered devices may support complex operations with a lesser penalty on energy consumption, having application in numerous contemporary devices including those with multiple cores, those support multimedia applications, and so forth. As still another benefit, in alternative embodiments other device parameters may be adjusted in response to a dynamic evaluation of critical path speed capability and/or device leakage, where by way of example one such parameter is an adjustment of system clock speed. In addition to these benefits, the preferred embodiments also have benefit in devices having varying operational characteristics in a single yield of such devices. In other words, it is known in the manufacturing art that for a group of devices, certain ones of those may perform more optimally than others. The prior art uses various approaches to deal with this reality, including by way of example setting certain operational characteristics for the entire group as limited by the lesser performing devices. However, at least with respect to control of various system parameters (e.g., $V_{DD}$, $V_{BB}$, clock speed), the preferred embodiments may be implemented in an entire group of such devices, allowing each device in that group to dynamically self-adjust its values of $V_{DD}$ and $V_{BB}$ (or other parameters, including frequency) consistent with the above teachings, thereby permitting different devices from the same group to operate at different system voltages, yielding improved individual operation from device to device as compared to scaling the entire set of devices to accommodate a worst case scenario provided by the lesser performing devices in the yield. Thus, the optimal $V_{DD}$ and $V_{BB}$ may differ from chip architecture to chip architecture, from process node to process node, and also with temperature. As another benefit of those preferred embodiments that adjust $V_{DD}$ and/or $V_{BB}$, note that in the past, certain integrated circuit manufacturers have taken a conservative approach in evaluating a lot of devices and then providing operational voltage and frequency specifications according to certain assumptions from the overall results of the lot; often these assumptions typically include worst-case scenarios, such as what performance is achievable from the lower quality silicon in the lot with a fixed voltage supply. As such, often a resulting operational frequency is specified at a corresponding provided fixed system voltage, with both corresponding to a specified amount of power consumption. Thus, devices from the same lot that may have a higher quality silicon axe constrained to operate under these lower performance specifications, when in fact some of these devices are capable of operating more efficiently (e.g., higher speeds and/or less energy consumption). However, with the preferred embodiments, and given the ability to dynamically adjust the values of $V_{DD}$ and/or $V_{BB}$ and/or clock speed in response to operational speed capacity and current leakage, then at the same nominal amount of power consumption of the fixed voltage case, greater operational frequencies may be achieved. Thus, the preferred embodiments provide an overall improvement in not only power management as it relates to provided voltage, but also to energy efficiency in that leakage is also improved and also to performance in that higher frequencies may be achieved at a same level of power consumption used by slower performing devices in the prior art As another benefit of the preferred embodiments, it has been shown that various substitutions, modifications or alterations could be made to the descriptions set forth above without departing from the inventive scope. Consequently, while the present embodiments have been described in detail, that inventive scope is further intended to include the variations shown herein by example and ascertainable by one skilled in the art, as further is defined by the following claims.

The invention claimed is:

1. A power management system in an electronic device, comprising:
   circuitry, responsive to at least one system parameter, and operable in response to at least one system clock and for providing data processing functionality, wherein the circuitry for providing data processing functionality comprises a data path;
   circuitry for indicating a potential capability of operational speed of the data path,
   wherein the circuitry for indicating a potential capability of operational speed of the data path is for operating at a speed that is not in response to the at least one system clock; and
   circuitry for adjusting the at least one system parameter in response to the circuitry for indicating a potential capability.

2. The system of claim 1 and further comprising circuitry for indicating an amount of current leakage of the circuitry for providing data processing functionality, wherein the circuitry for adjusting is for adjusting the at least one system parameter further in response to the circuitry for indicating an amount of current leakage.

3. The system of claim 2 wherein the at least one system parameter is selected from a set consisting of a system voltage and the at least one a system clock signal.

4. The system of claim 2 wherein the circuitry for indicating an amount of current leakage comprises circuitry for providing a signal that is proportional to an amount of current leakage.

5. The system of claim 2 wherein the circuitry for indicating a potential capability of operational speed of the data pat operates at a speed in response to the at least one system parameter and outputs a signal representing the potential capability of operational speed.

6. The system of claim 5:
wherein the circuitry for adjusting comprises circuitry for comparing the signal representing the potential capability of operational speed with the system clock as it switched over a first time period.

7. The system of claim 6 wherein the at least one system parameter is selected from a set consisting of a system voltage and the at least one system clock signal.

8. The system of claim 6:
wherein the at least one system parameter comprises at least one system voltage; and
wherein the circuitry for adjusting causes a decrease in the at least one system voltage in response to a measure, responsive to the signal representing the potential capability of operational speed, exceeding a comparable measure responsive to the at least one system clock.

9. The system of claim 8 wherein the circuitry for adjusting causes an increase in the at least one system voltage in response to the at least one system clock exceeding the signal representing the potential capability of operational speed.

10. The system of claim 8:
wherein the circuitry for indicating a potential capability further operates in response to a back bias voltage; and
wherein the circuitry for adjusting causes an increase in the at least one system voltage and a decrease in the back bias voltage in response to the at least one system clock exceeding the signal representing the potential capability of operational speed.

11. The system of claim 8:
wherein the circuitry for indicating a potential capability further operates in response to a back bias voltage; and
wherein the circuitry for adjusting causes a decrease in the at least one system voltage and an increase in a back bias voltage in response to the signal, representing the potential capability of operational speed, exceeding the at least one system clock.

12. The system of claim 6:
wherein the at least one system parameter comprises the at least one system clock; and
wherein the circuitry for adjusting causes an increase in the at least one system clock, after the first time period, in response to the signal, representing the potential capability of operational speed, exceeding the at least one system clock as it switched over the first time period.

13. The system of claim 6:
wherein the at least one system parameter comprises the at least one system clock; and
wherein the circuitry for adjusting causes a decrease in the at least one system clock, after the first time period, in response to a measure of the signal, representing the potential capability of operational speed, being less than a comparable measure of the at least one system clock as it switched over the first time period.

14. The system of claim 2:
wherein the at least one system parameter comprises at least one system voltage;
wherein the circuitry for indicating a potential capability further operates in response to a back bias voltage; and
wherein, responsive to an amount of leakage indicated by the circuitry for indicating an amount of current leakage being below a threshold, and also in response to the signal, representing the potential capability of operational speed, exceeding the at least one system clock, the circuitry for adjusting causes a larger reduction in magnitude in the at least one system voltage as compared to an increase in magnitude in the back bias voltage.

15. The system of claim 2:
wherein the at least one system parameter comprises at least one system voltage;
wherein the circuitry for indicating a potential capability further operates in response to a back bias voltage; and
wherein, responsive to an amount of leakage indicated by the circuitry for indicating an amount of current leakage being below a threshold, and also in response to the signal, representing the potential capability of operational speed, exceeding the at least one system clock, the circuitry for adjusting causes only a reduction in the at least one system voltage and no change in the back bias voltage.

16. The system of claim 2:
wherein the at least one system parameter comprises at least one system voltage;
wherein the circuitry for indicating a potential capability further operates in response to a back bias voltage; and
wherein, responsive to an amount of leakage indicated by the circuitry for indicating an amount of current leakage being above a threshold, and also in response to a measure of the signal, representing the potential capability of operational speed, exceeding a comparable measure of the at least one system clock, the circuitry for adjusting causes a lesser reduction in magnitude in the at least one system voltage as compared to an increase in magnitude in the back bias voltage.

17. The system of claim 2:
wherein the at least one system parameter comprises the at least one system voltage;
wherein the circuitry for indicating a potential capability further operates in response to a back bias voltage; and
wherein, responsive to an amount of leakage indicated by the circuitry for indicating an amount of current leakage being above a threshold, and also in response to a measure of the signal, representing the potential capability of operational speed, exceeding a comparable measure of the at least one system clock, the circuitry for adjusting causes only a reduction in the back bias voltage and no change in the at least one system voltage.

18. The system of claim 2:
wherein the circuitry for indicating a potential capability of operational speed of the data path operates at a speed in response to the at least one system parameter and outputs a signal representing the potential capability of operational speed; and wherein the circuitry for adjusting comprises circuitry for comparing a measure of the signal representing the potential capability of operational speed with a comparable measure of the at least one system clock.

19. The system of claim 18:
wherein the at least one system parameter comprises at least one system voltage;
wherein the circuitry for providing data processing functionality is further responsive to the at least one system clock; and
wherein the circuitry for adjusting causes a decrease in the at least one system voltage in response to the measure of the signal exceeding the comparable measure of the at least one system clock.

20. The system of claim 19 wherein the circuitry for adjusting causes an increase in the at least one system voltage in response to the measure of the at least one system clock exceeding the measure of the signal.

21. The system of claim 20:
wherein the circuitry for indicating a potential capability further operates in response to a back bias voltage; and
wherein the circuitry for adjusting causes an increase in the at least one system voltage and a decrease in the back bias voltage in response to the measure of the at least one system clock exceeding the measure of the signal.

22. The system of claim 20:
wherein the circuitry for indicating a potential capability further operates in response to a back bias voltage; and
wherein the circuitry for adjusting causes a decrease in the at least one system voltage and an increase in a back bias voltage in response to the measure of the signal exceeding the measure of the at least one system clock.

23. The system of claim 2:
wherein the at least one system parameter comprises at least one system voltage; and
wherein the circuitry for indicating a potential capability of operational speed of the data path operates at a speed in response to the at least one system voltage and in response to a back bias voltage, and outputs a frequency signal representing the potential capability of operational speed at the at least one system voltage and the back bias voltage.

24. The system of claim 1, wherein the circuitry for indicating a potential capability has an operational speed and comprises trimming circuitry, adjustable after manufacture of the circuitry for indicating a potential capability, for adjusting the operational speed of the circuitry for indicating a potential capability.

25. The system of claim 24 wherein the trimming circuitry comprises circuitry for receiving one or more digital values to adjust the operational speed of the circuitry for indicating a potential capability.

26. The system of claim 1:
wherein the data path comprises a plurality of transistors;
wherein each transistor in the plurality of transistors has a gate width on the order of 90 microns;
wherein a single integrated circuit comprises the circuitry for indicating a potential capability and the data path; and
wherein the circuitry for indicating a potential capability and the data path are no greater than 100 microns apart on the singe integrated circuit.

27. The system of claim 1 wherein the circuitry for indicating a potential capability comprises an approximate square layout on an integrated circuit.

28. The system of claim 1:
wherein the at least one system parameter comprises at least one system voltage;
wherein the system voltage comprises a battery-supplied system voltage.

29. The system of claim 1 wherein the circuitry for providing a data processing functionality comprises circuitry for providing a mobile phone data processing functionality.

30. The system of claim 1 wherein the circuitry for providing a data processing functionality is selected from a set consisting of a microprocessor and a digital signal processor.

31. The system of claim 1 wherein the data path comprises a first data path and wherein the circuitry for indicating a potential capability of operational speed comprises a first circuitry for indicating a potential capability of operational speed, and further comprising:
a plurality of data paths, including the first data path;
a plurality of circuitries, including the first circuitry for indicating a potential capability of operational speed, wherein each circuit in the plurality of circuitries, is for indicating a potential capability of operational speed of a respective data path in the plurality of data paths and operates at a speed that is not in response to the at least one system clock; and
wherein the circuitry for adjusting the at least one system voltage is further responsive to each circuit in the plurality of circuitries.

32. The system of claim 1:
wherein the circuitry for providing data, circuitry for indicating, and circuitry for adjusting are on a single integrated circuit; and
wherein the circuitry for adjusting further adjusts the at least one system parameter to different values at different locations of the single integrated circuit.

33. The system of claim 1 wherein the circuitry for adjusting is for periodically adjusting the at least one system parameter.

34. The system of claim 1 wherein the at least one system parameter is selected from a set consisting of a system voltage, wherein the system voltage is selected from a set consisting of $V_{DD}$ and a back bias voltage.

35. A method of power management system in an electronic device, comprising:
with circuitry in the electronic device, indicating a potential capability of operational speed of a data path in circuitry for providing data processing functionality, wherein the circuitry for providing data processing functionality is responsive to at least one system parameter, wherein the circuitry for providing data processing functionality is responsive to at least one system clock and the circuitry for indicating a potential capability of operational speed is for operating at a speed that is not in response to the at least one system clock; and
with circuitry in the electronic device, adjusting the at least one system parameter in response to the indicating step.

36. The method of claim 35 and further comprising:
periodically repeating the indicating step; and
periodically and selectively repeating the adjusting step in response to respective periodic occurrences of the indicating step.

* * * * *